Nov. 20, 1951  H. A. GOLLMAR  2,575,341
PROCESS FOR THE RECOVERY OF BUTADIENE
FROM CYCLOHEXANE PYROLATE
Filed Jan. 24, 1946
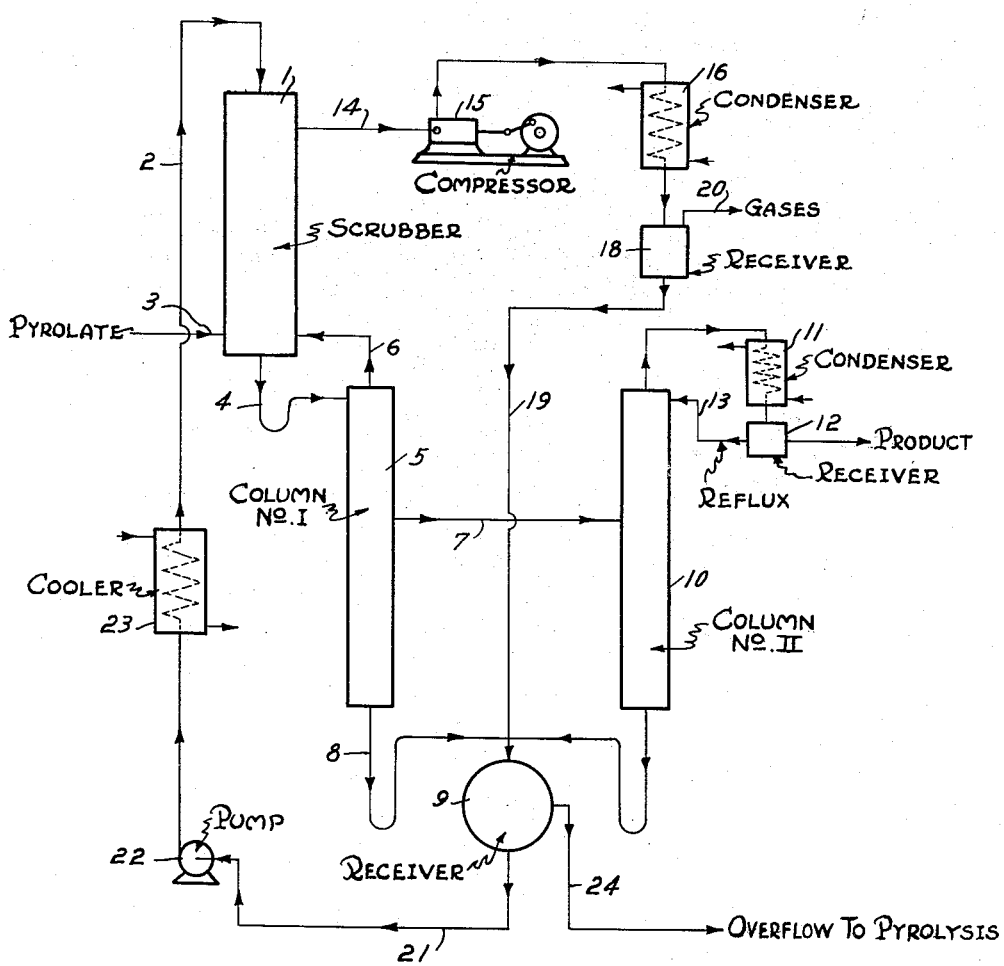
WITNESSES:
INVENTOR
HERBERT A. GOLLMAR.
BY
ATTORNEY Patented Nov. 20, 1951

2,575,341

UNITED STATES PATENT OFFICE 2,575,341

PROCESS FOR THE RECOVERY OF BUTADIENE FROM CYCLOHEXANE PYROLATE

Herbert A. Gollmar, Mount Lebanon, Pa., assignor to Koppers Company, Inc., Pittsburgh, Pa., a corporation of Delaware Application January 24, 1946, Serial No. 643,184

5 Claims. (Cl. 260—681.5)

1

This invention relates to the manufacture of butadiene and is particularly directed to improvements in methods for recovering butadiene from the products of the pyrolitic decomposition of cyclohexane.

The primary objects of the invention are to provide new and improved methods of separating butadiene from cyclohexane pyrolate; to provide new and improved methods of absorbing the butadiene in and recovering it from cyclohexane; to provide such methods which do not require the use of superatmospheric pressure; to provide new and improved methods of distilling solutions of cyclohexane pyrolate in cyclohexane; and to avoid the disadvantages of the prior art and to obtain advantages as will become apparent. Further objects will appear as the description proceeds.

These objects are accomplished in the present invention by preparing a solution of cyclohexane pyrolate in cyclohexane, which may be the unchanged cyclohexane of the pyrolysis or supplementary cyclohexane, distilling said solution, taking overhead a fraction containing sufficient butadiene to carry over substantially all of the light ends, scrubbing said fraction with cyclohexane to absorb butadiene therefrom, comingling the absorbate and said solution and treating the remainder of said solution to separate cyclohexane and butadiene.

It has been proposed heretofore in the manufacture of butadiene by the pyrolysis of cyclohexane to absorb the butadiene in cyclohexane. Part of this absorption is effected in the unchanged cyclohexane on quenching the products of the pyrolysis, which, for convenience, are herein referred to as the cyclohexane pyrolate. The remainder of the absorption is effected by scrubbing the gaseous products with cyclohexane in two stages, the last of which is carried out at superatmospheric pressure. Butadiene is recovered from the cyclohexane solution thus obtained and freed of the light ends, that is the lower boiling hydrocarbons formed in the pyrolysis, by distillation followed by fractionation.

It is one of the objects of the present invention to avoid the disadvantages incident to the use of superatmospheric pressure without, at the same time, incurring other disadvantages due to the relative insolubility of butadiene in cyclohexane. The prior art evidently has sought to avoid this particular difficulty by using superatmospheric pressures but the instability of butadiene to heat and compression makes such expedients undesirable. The present invention provides

2 means whereby large volumes of cyclohexane required to absorb the butadiene at atmospheric pressure can be handled effectively and economically without imposing an excessively great burden upon the distillation and fractionation of the cyclohexane solution.

The invention may be more fully understood by reference to the accompanying flow sheet. The cyclohexane pyrolate either in the gaseous state or in solution in the unchanged cyclohexane or in both states is fed into a scrubbing tower 1 over which is circulated through line 2 a quantity of cyclohexane sufficient to absorb all or substantially all of the butadiene of the pyrolate. The cyclohexane pyrolate is introduced into the scrubber 1 at or near the bottom as illustrated at 3 and the gases pass upwardly through the scrubber in countercurrent flow with the descending stream of cyclohexane.

The effluent of the scrubber 1, which is a solution of the cyclohexane pyrolate in cyclohexane, is withdrawn from the bottom of the scrubber and passed through line 4 into the No. 1 fractionating column 5 at or adjacent the top thereof. An overhead fraction is taken off at 6 and a side stream fraction is taken off at 7. The temperature gradient in the still is maintained so as to give a residue or bottom fraction essentially free of butadiene. The bottom fraction is taken off through line 8 into the receiver 9.

By introducing the pyrolate solution at or adjacent the top of column 5 there is obtained an overhead fraction rich in butadiene. This ensures that all of the light ends are taken off so that the side stream fraction consists essentially of butadiene, cyclohexane and any $C_4$ and $C_5$ hydrocarbons other than butadiene which may have been formed as a result of the pyrolysis.

The overhead fraction is scrubbed with cyclohexane to recover the butadiene and the resulting solution is returned to the top of column 5. Conveniently this scrubbing may be effected in the scrubbing tower 1 simultaneously with the scrubbing of the pyrolate. The effect is that a certain quantum of butadiene is entrained in a cycle involving the fractionating column 5 and the scrubber 1 and functions to provide complete or substantially complete stripping of the light ends from the cyclohexane solution. The remainder of the cyclohexane solution may then be treated in any suitable manner though preferably in the manner already described to separate the butadiene and cyclohexane.

By taking off a side stream fraction from the No. 1 column and taking off a cyclohexane fraction at the bottom, the quantity of butadiene solution which must be handled in the separation of butadiene and cyclohexane is greatly diminished. Thus the side stream fraction may be passed through line 7 into the No. 2 fractionating column 10 without requiring an excessively large fractionating column. The fractionating column 10 is operated to give an overhead fraction boiling substantially as butadiene and a bottom fraction boiling substantially as cyclohexane. Any $C_5$ hydrocarbons will remain in the bottom fraction. The side stream fraction is introduced at a suitable level corresponding to its composition. The overhead is taken into condenser 11 and collected in the receiver 12. Part of the condensate is recycled through line 13 as reflux and the balance is diverted as product.

The gaseous effluent of the scrubber 1 is passed through line 14 into compressor 15. The compressed gases are passed through the condenser 16 to condense out any cyclohexane carried over from the scrubber. The condensed cyclohexane is collected in receiver 18 whence it is returned to the process suitably by passage along 19 into receiver 9. The gases are passed through line 20 for further treatment for the recovery of ethylene.

Cyclohexane is withdrawn from receiver 9 through line 21 in the amount required for operation of the scrubber 1. The amount circulated for this purpose suitably may be regulated by pump 22. In order to increase its capacity to absorb butadiene, it may be passed through a suitable cooler 23. The surplus cyclohexane corresponding to the unchanged cyclohexane in the pyrolate passes out of the receiver 9 through the overflow 24 and is returned to the pyrolysis.

The invention may be more fully understood by the following detailed description in which the parts are by weight unless otherwise specified.

A typical reaction gas from the pyrolysis of cyclohexane contains in the order of 75 per cent unchanged cyclohexane and 25 per cent pyrolate. The pyrolate contains in the order of 75 per cent of ethylene and butadiene in approximately equal proportions. The balance is made up principally of hydrogen, methane, ethane, propylene, butene and pentene with the major constituent, propylene, in the order of 10 per cent. This reaction gas is quenched in water whereupon the bulk of the cyclohexane is condensed along with about 15–20 per cent of the butadiene and significantly smaller percentages of the other constituents of the pyrolate. The bulk of the light ends, that is the $C_1$, $C_2$ and $C_3$ hydrocarbons and hydrogen, remain in the gaseous fraction. Altogether about 98 per cent of the light ends remain in the gaseous fraction. There is thus obtained a liquid fraction made up essentially of a solution of butadiene in cyclohexane in a concentration in the order of 2.5–3 per cent butadiene along with a few tenths of one per cent of light ends and similarly small amounts of butene and pentene and a gaseous fraction containing the rest of the butadiene and the bulk of the light ends.

The gaseous fraction of the pyrolate is passed into the scrubber 1 simultaneously with or in admixture with the overhead fraction of the No. 1 fractionating column 5. The mixture of these fractions passes upwardly through the scrubber in countercurrent flow to a descending stream of cyclohexane. The heat of absorption is extracted either externally or internally and the temperature conditions are suitably controlled to give an inlet temperature of about 20° C. and an outlet temperature of about 35° C. Cyclohexane is passed through the scrubber in proportion to the amount of the effluent gases as required to provide effective scrubbing for the removal of butadiene. Ordinarily from 5½ to 9½ mols of cyclohexane for each mol of gaseous mixture leaving the scrubber will suffice. Under typical conditions the effluent from the scrubber will have approximately the same concentration as the pyrolate condensate. The two consequently may be combined if desired or the pyrolate condensate may be fed to the bottom of the scrubber. The resulting solution of butadiene in cyclohexane constitutes the make-up liquor for the No. 1 rectifying column 5.

The No. 1 rectifying column 5 is operated in combination with the absorber 1 in order to effect complete recovery of butadiene and complete separation of the light ends. To this end the feed solution is introduced at the top of the column where it functions to regulate the temperature at the top of the column and to carry overhead sufficient butadiene to ensure that all or substantially all of the light ends are stripped from the solution. Ordinarily this may be accomplished effectively by taking off in the order of 30–35 per cent of the $C_4$ hydrocarbons. The volume of make-up liquor fed to the column will ordinarily suffice to keep the overhead at the proper temperature so that cooling of the overhead before it passes into the absorber is not required under conditions of normal operation.

The side stream fraction may be taken off at any convenient elevation depending upon the desired composition and distribution between the side stream fraction and the bottom fraction. Preferably the side stream is taken off as far up the column as possible in order to obtain a maximum butadiene concentration. With a properly designed column it is possible to take off the side stream fraction containing in the order of 3.5 per cent butadiene and virtually no light ends. Under such conditions approximately one-half of the cyclohexane fed to the column is removed in the bottom fraction.

The conditions of temperature in column 5 are maintained as required to accomplish the above described separation. Ordinarily a temperature in the order of 85° C. at the bottom of the column and in the order of 35–40° C. at the top of the column and with the side stream fraction in the order of 65° C. will suffice to accomplish the desired results. The pressure in this column is maintained substantially at atmospheric with only such variation as may be induced by the conditions of temperature within the columns.

Preferably the No. 1 column is so designed and operated that from about 30 to about 70 per cent of the cyclohexane fed to the column is withdrawn in the bottom fraction and the balance in the side stream fraction. Under these conditions the volume of liquor required to be handled in the final distillation is substantially smaller.

It is possible, however, so to design and operate the column that any amount of the cyclohexane fed to the column from about 30 per cent on up to and including 100 per cent appears in the fraction passed on to the No. 2 rectifying column. Where 100 per cent of the cyclohexane appears in this fraction, the No. 1 column will no longer be operating with a side stream fraction and the fraction passed on to No. 2 column will be taken off as bottoms. Under these conditions it is sometimes desirable to provide a third column in which a portion of the cyclohexane solution of pyrolate is fed to the top. Cyclohexane is taken off at the bottom as a substantially butadiene-free fraction and the other constituents are taken off at the top and introduced into the scrubber 1 in like manner as the overhead of the No. 1 column. In this manner a portion of the cyclohexane is separated and returned to the scrubbing liquor circuit with the net result that the total volume of solution which needs to be processed in the No. 2 rectifying column is substantially smaller.

The side stream fraction is fed to the No. 2 rectifying column which is so operated as to take the C₄ hydrocarbons overhead and leave the C₅ and C₆ hydrocarbons in the bottoms. This column suitably is operated at superatmospheric pressure sufficiently high to give an overhead temperature such that the butadiene may be condensed at ordinary temperatures. Thus at a pressure of about 40 pounds per square inch gauge the overhead temperature is about 35° C. and the bottoms is about 140° C. Under these conditions the overhead fraction readily condenses in condenser 11 with ordinary cooling water. A suitable proportion of this condensate, say in the order of 50–55 per cent, is returned as reflux and the remainder is taken off as product. There may thus be obtained butadiene essentially free of products of pyrolysis other than butene.

Where it is desirable to avoid compressing butadiene, the No. 2 rectifying column may be operated substantially at atmospheric pressure. Under these conditions it will be necessary to employ refrigeration to condense the butadiene. Under such conditions it is suitable to operate with an overhead temperature in the order of —5° C. and a bottom temperature in the order of 85° C.

The bottom fraction of both columns is combined and handled as already described.

The combined action of the scrubber 1 and rectifying column 5 obtained by introducing the cyclohexane solution of pyrolate at the top of column 5 and passing the overhead up through the scrubber along with the gaseous pyrolate makes it possible to effect substantially complete separation of the light ends. Moreover the light ends are scrubbed completely free of butadiene so that complications which otherwise result from polymerization of butadiene in the compression of the gases for the recovery of ethylene are avoided. Thus the gaseous effluent of the scrubbing tower consists of light ends and cyclohexane rather than light ends and butadiene as would be the case were the light ends separated by the fractionating column alone. This gaseous effluent therefore may be compressed as desired for the recovery of ethylene and incidental to the compression and cooling any cyclohexane contained therein is condensed out and may be returned to the butadiene recovery as above described.

Through the use of a single scrubber to scrub both the gaseous pyrolate and the overhead fraction of the No. 1 fractionating column, an unexpected advantage is obtained in that complete scrubbing of both gases can be obtained with a minimum of cyclohexane, that is with a quantity of cyclohexane less than would be required if the two scrubbing operations were effected separately. Thus by passing the overhead from the No. 1 fractionating column upwardly through scrubber 1, it is possible to obtain complete separation of the light ends without any appreciable carryover of butadiene without requiring much increased scrubber capacity and with a much smaller fractionating column than would be required to take the light ends overhead directly.

In place of using cyclohexane as the absorbate, it is advantageous to use a mixture of cyclohexane and benzene. By including a small amount of benzene in the cyclohexane, the freezing point of the cyclohexane may be substantially lowered. This has the advantage that in the ethylene recovery the gaseous effluent of the scrubber may be compressed as desired without danger of a cyclohexane freezing in the ethylene recovery system. Any quantity of benzene up to the eutectic composition and somewhat above will effect a lowering of the freezing point in proportion to the amount of benzene up to the eutectic composition. The more nearly the amount of benzene approaches the eutectic composition, the greater is the lowering of the freezing point. The amount of benzene advantageously, therefore, is substantially that of the eutectic composition, that is about 25 per cent. In this proportion the freezing point is about —44° C. While it is desirable to avoid excessive amounts of benzene, nevertheless it is more desirable to have the benzene content somewhat higher than the eutectic composition than to have it too low.

While I have described my invention with reference to particular conditions of operations, it will be understood that those skilled in the art being apprized of the objects and purposes of the invention will be capable of making variations therein without departing from the spirit and scope of the invention as described above and set forth in the appended claims.

I claim:

1. In the manufacture of butadiene by the pyrolysis of cyclohexane the method of recovering butadiene essentially free of other products of the pyrolysis which comprises scrubbing the butadiene-containing gaseous products of the pyrolysis with an absorbent consisting essentially of a low freezing point mixture of cyclohexane and benzene, cooling and compressing the effluent gases from said scrubbing to condense any cyclohexane and benzene entrained therein, returning the condensate to the absorbent and recovering butadiene from the liquid effluent of said scrubbing.

2. In a process in which a gas containing butadiene and ethylene is scrubbed with cyclohexane selectively to dissolve butadiene and in which the effluent gas containing ethylene and cyclohexane vapor is cooled and compressed in the recovery of ethylene therefrom, the method of preventing solidification of cyclohexane in the cooling and compressing which comprises incorporating in said effluent gas before said cooling and compressing an amount of benzene vapor sufficient to lower the freezing point of the cyclohexane.

3. The process of claim 2 in which the amount of benzene is about 1 part for each 4 parts of cyclohexane.

4. In the manufacture of butadiene by the pyrolysis of cyclohexane the method of recovering butadiene essentially free of other products of the pyrolysis which comprises passing butadiene-containing gaseous products of the pyrolysis and a light ends-fraction of a subsequent distillation upwardly through a scrubber substantially at atmospheric pressure in countercurrent flow to a descending stream of absorbent consisting predominantly of cyclohexane, said absorbent containing benzene in amounts sufficient to lower the freezing point, withdrawing liquid and gaseous effluent from said scrubber and introducing said liquid effluent at the top of a fractionating column operated substantially at atmospheric pressure, taking overhead from said column as said light ends-fraction a fraction containing sufficient butadiene to carry over substantially all material boiling below $C_4$ hydrocarbons, taking off from said column a side stream fraction consisting essentially of butadiene and absorbent and a bottom fraction consisting essentially of absorbent, distilling said side stream fraction to separate the butadiene from the absorbent, recycling the said absorbent fractions to provide make up for said scrubber, compressing and cooling the gaseous effluent from said scrubber, separating condensate therefrom and returning said condensate to said absorbent.

5. The method of claim 4 in which the absorbent contains about one part of benzene for each four parts of cyclohexane.

HERBERT A. GOLLMAR.

REFERENCES CITED

The following references are of record in the file of this patent:

UNITED STATES PATENTS

| Number | Name | Date |
|---|---|---|
| 1,948,777 | Young et al. | Feb. 27, 1934 |
| 2,227,953 | Baehr et al. | Jan. 7, 1941 |
| 2,364,377 | Lawrence | Dec. 5, 1944 |
| 2,371,817 | Frey | Mar. 20, 1945 |

FOREIGN PATENTS

| Number | Country | Date |
|---|---|---|
| 532,821 | Great Britain | Jan. 31, 1941 |